United States Patent [19]

Pasqualucci et al.

[11] 3,871,966

[45] Mar. 18, 1975

[54] PROCESS FOR THE PRODUCTION OF ANTIBIOTICS

[75] Inventors: Carmine Renato Pasqualucci, Milan; Giuseppe Zucco, Rovereto, both of Italy

[73] Assignee: Arckifar Industrie Chimiche Del Trentino S.p.A., Rovereto, Trento, Italy

[22] Filed: Oct. 12, 1973

[21] Appl. No.: 405,829

[30] Foreign Application Priority Data
Nov. 29, 1972 Italy .................................. 32248/72

[52] U.S. Cl. .............................................. 195/80 R
[51] Int. Cl. .............................................. C12d 9/00
[58] Field of Search ................................... 195/80 R

[56] References Cited
UNITED STATES PATENTS

| | | | |
|---|---|---|---|
| 2,999,048 | 9/1961 | Donovick et al. | 195/80 R |
| 3,150,046 | 9/1964 | Sensi et al. | 195/80 R |

*Primary Examiner*—Lionel M. Shapiro
*Assistant Examiner*—Robert J. Warden

[57] ABSTRACT

A process for producing Rifamycin B substantially free from analogues sub-products and with high productivity. According to this process a mutant of the microorganism of the species Streptomyces Albovinaceus is cultivated in an aqueous nutrient medium of controlled initial pH containing assimilable sources of carbon, nitrogen and inorganic salts, in submerged aerobic conditions: Rifamycin B is produced which is then recovered by conventional methods.

1 Claim, No Drawings

PROCESS FOR THE PRODUCTION OF ANTIBIOTICS

This invention relates to production of rifamycin B by fermentation of the mutant called Streptomyces G5/A.

The new mutant high producer of rifamycin B, as isolated by the applicant, has been obtained by repeated mutagenic treatments with U.V. radiations and subsequent selections of colonies exhibiting an improved production of rifamycin B, from a culture specimen of the Streptomyces albovinaceous stock ATCC 12,951 and which is the subject of U.S. Pat. No. 2,999,048.

It is known that the nancimycin described in U.S. Pat. No. 2,999,048 is in practice an antibiotic called by others rifamycin B (see French Pat. No. 2,043,847) and this antibiotic can be produced by submerged aerobic fermentation in a nutrient medium containing a source of assimilable carbon, assimilable nitrogen and mineral salts agitated at a controlled temperature of the microorganism ATCC 12951 as described in the abovementioned U.S. patent. The productivity of this microorganism is not, however, such as to allow exploitation in conditions which would be economically attractive from the industrial viewpoint.

We have now, surprisingly, found that a mutant of the microorganism known as ATCC 12,951 is extremely active in producing rifamycin B. This mutant has been called by the applicant Streptomyces G5/A and has been deposited on May 23, 1972 with the public collector CENTRAALBUREAU VOOR SCHIMMELCULTURES Baarn - Nederland, where it is identified by the number G/5 A.

Furthermore the Rifamycin B obtained by this invention does not contain substantial quantities of secondary analogous products. This is also a significant advantage as far as the effects of further purification of the final product are concerned.

This invention relates to an improved process for producing Rifamycin B substantially free from analogues sub-products and with high productivity. According to this process a mutant of the microorganism of the species Streptomyces Albovinaceus is cultivated in an aqueus nutrient medium of controlled initial pH containing assimilable sources of carbon, nitrogen and inorganic salts, in submerged aerobic conditions: Rifamycin B is produced which is then recovered by conventional methods.

The streptomyces G5/A of this invention presents taxonomic characteristics different from those of other rifamycin-producing organisms as shown in the following tables.

For taxonomic studies, as also for some additional media, the methods and culture media described by Shirling and Gottlieb (Int. system Bact., 16 313–340, 1966) have been used.

For colour description the colour tables of H. Prauser have been used (Prauser H.1964. Aptness and application of colour codes for exact description of colours of streptomycetes. Zeitschrift f.Allg. Mikrobiologie, 4, 95–98).

From comparison of the data obtained it is obvious that the streptomyces G5/A differs from other strains in various and fundamental characteristics.

Table 1 sets out the general characteristics of the cultures of the strain of this invention and of the traditional rifamycin-producing strains.

Table 2 sets out the assimilation capacity of carbon compounds by the above-mentioned strains.

Table 3 sets out the biochemical characteristics of the various strains.

Table 4 sets out the characteristics of the culture grown on various standard media.

TABLE 1

GENERAL CHARACTERISTICS OF THE CULTURES

| | Str. G5/A | Str. Albovinaceus ATCC 12951 | Str. Mediterranei ATCC 21271 | Str. Mediterranei ATCC 13685 | 4107/A$_2$ | B 2847 |
|---|---|---|---|---|---|---|
| Spores | Absent | Ellipsoidal or oval | Absent | Rod-like | Cylindric, with a smooth surface | Ellipsoidal, with a smooth surface |
| Aerial mycelium | Absent | White to violet sporophores with spores in chains, no spirals | Absent | Mealy, pinkish-white, sporophores with spores in chains, no spirals | Pink to white, sporophores | White with simple straight branches spores in chains |
| Vegetative mycelium | Dark brown to light brown with tinges of orange to dark orange | Light pink to brown | Yellow-orange to strong dark yellow | Yellowish to pink-orange | Red to orange | Colourless to yellowish |
| Soluble pigments | Dark to light brown to yellow with a green tinge | Mostly absent; when there are any they present a dark red colouration | Yellowish green to strong yellow brown | Absent or yellowish | Brown to purple | Yellow orange to yellow brown |

Str. G5/A = mutant subject of this invention;
Str. Albovinaceus – U.S. patent 2,999,048;
Str. Mediterranei ATCC 21271 – Swiss patent 477551;
Str. Mediterranei ATCC 13685 – U.S. patent 2,988,490;
4107/A$_2$ – Journal Antibiotic XVII 29 1964;
B 2847 – Journal Antibiotic XXIV, 810, 1971.

TABLE 2

ASSIMILATION OF CARBON COMPOUNDS

| Carbon source | Str. G5/A | Str. Albovinaceus ATCC 12951 | Str. Mediterranei ATCC 21271 | Str. Mediterranei ATCC 13685 | 4107 A$_2$ | B 2847 |
|---|---|---|---|---|---|---|
| Glucose | ++ | ++ | ++ | ++ | ++ | +++ |
| Arabinose | ++ | − | ++ | +++ | + | ++ |
| Rhamnose | + | ++ | ++ | ++ | + | +++ |
| Xylose | + | ++ | ++ | ++ | − | ++ +++ |
| Galactose | − | ++ | ++ | +++ | ++ | +++ |
| Fructose | + | ++ | ++ | +++ | ++ | ++ |
| Mannose | ± | ++ | ++ | ++ | ++ | ++ |
| Lactose | ± | ++ | ± | ++ | ± | + + + |
| Maltose | ± | ++ | − | + | + | ++ |
| Sucrose | − | ++ | ++ | ++ | + | ++ |
| Raffinose | ± | ++ | − | − | − | + ++ |
| Dextrin | − | ++ | − | ++ | Not det. | Not det. |
| Inulin | − | ± | − | − | ± | ++ |
| Dulcitol | − | − | − | − | − | + ++ |
| Glycerine | ++ | ++ | ++ | +++ | Not det. | ++ |
| Mannitol | − | ++ | ++ | ++ | − | + ++ |
| Inositol | ± | ++ | ++ | ++ | ++ | +++ |
| Sorbitol | | | | | | |
| Na-succinate | | Not det. | | | | |
| Na-acetate | | | | | | |
| Glicolia | | Not det. | | | Not det. | Not det. |
| Salicin | | | | | Not det. | |
| Starch (soluble) | | | | | | |
| Cellulose | | Not det. | | | Not det. | Not det. |
| Na-citrate | | | | | | |

+++ Excellent utilization
++ Very positive utilization
+ Positive utilization
± Doubtful utilization
− Negative utilization
1 − Sec. Sensi, P., Thiemann J. E. Progress in Industrial Microbiology, Vol. 6, 21-60, 1967 (D. J. Hockenhull, Ed.) London Heywood Books, London.

TABLE 3

BIOCHEMICAL CHARACTERISTICS

| | Str. G5/A | Str. Albovinaceus ATCC 12951 | Str. Mediterranei ATCC 21271 | Str. Mediterranei ATCC 13685 | 4107 A$_2$ | B 2847 |
|---|---|---|---|---|---|---|
| Agarized Ca-malate | Slight digestion | Not determined | Not digested | Slight digestion | Not determined | Not determined |
| Agarized tyrosine | Not hydrolysed | Not determined | Not hydrolysed | Not hydrolysed | Not determined | Not determined |
| Gelatine | No liquefaction, no pigment | Liquefaction | No liquefaction | Slight to no liquefaction no pigment | Strong liquefaction | Rapid liquefaction, yellowish brown brown pigments |
| Nitrates | Not reduced | Reduced | Not reduced | Not reduced | | Rapid liquefaction, yellowish brown pigments |
| Litmus milk | No peptonisation or coagulation | No variation | No peptonisation or coagulation | No peptonisation or coagulation, slight alkaline reaction | Peptonisation | Low peptonisation without coagulation |
| Medium 6 of Shirling & Gottlieb (Pb acetate indicator) | Formation of H S; no pigmentation | Not determined | Formation of H S; no pigmentation | Formation of H S no pigmentation | Not determined | Not determined |
| Dextrin | Hydrolysed | Positive hydrolysation | Not hydrolysed | Positive hydrolysis | Not determined | Not determined |
| Starch (soluble) | Hydrolysed | positive hydrolysation | Not hydrolysed | Positive hydrolysis | No hydrolysis | Not determined |

1) Not determined means that the medium in question has not been used to determine the biochemical characteristics. However, as may be seen in the following tables, it is used to determine other characteristics.

TABLE 4

CHARACTERISTICS OF THE CULTURES OF SOME STANDARD MEDIA

| Media | Str. G5/A | Str. Albovinaceus ATCC 12951 | Str. Mediterranei ATCC 21271 | Str. Mediterranei ATCC 13685 | 4107 A$_2$ | B 2847 |
|---|---|---|---|---|---|---|
| Nutrient Agar (after Waksman) | G-Good, high, deeply wrinkled surface VM-Greyish (Oc4s) AM-Absent SP-Dark brown with reddish tinge (Oc5r) | G-good, surface rough, hard and crusty VM-Light brown with orange tinge (Oc3r) AM-Pale Pink (Oc7a) SP-Light yellowish brown (Coo2a) to pale pinkish brown | G-Moderate, flat, surface slightly rough VM-Light brown with slight tinge of orange AM-Absent SP-Absent | G-Moderate, surface smooth VM-Melon to orange AM-Pinkish white SP-Absent | G-Moderate VM-Yellow orange AM-Mealy, white SP-None | G-Poor to moderate colourless AM-Poor, white to pale greyish (Rdg Ll 15''''-f) R-Colourless to pale yellow orange SP-None |

TABLE 4 — Continued

CHARACTERISTICS OF THE CULTURES OF SOME STANDARD MEDIA

| Media | Str. G5/A | Str. Albovinaceus ATCC 12951 | Str. Mediterranei ATCC 21271 | Str. Mediterranei ATCC 13685 | 4107 A$_2$ | B 2847 |
|---|---|---|---|---|---|---|
| Bennett's Agar (after Waksman) | G-Good, high, very wrinkled surface VM-Dark brown with tinges of light red to greyish brown (O5r-Oc4s) AM-Absent SP-Dark brown with tinges of reddish to a slight greenish brown (Oc5r-Coo4r) | G-Good, rough, surface high, hard and crusty VM-Strong red (Or3r) AM-White-cream with light pink tinge (Coo7a) SP-Strong red (Or4r) | G-Good, high, surface very rough VM-Strong red or brown (O4r) AM-Absent SP-Light brown with tinges or orange (Oc3r) | G-Good VM-Yellowish tending to orange yellow AM-Pink SP-Light amber | G-Good VM-Dark orange to yellowish orange or vice-versa AM-Mealy, abundant, pale pink SP-Brown, residues | Not described |
| Medium 2 of Shirling & Gottlieb | G-Good, high, very wrinkled and involuted surface VM-Brown with tinges of lavender to orange (Oc5s-Oc3r) AM-Absent SP-Dark brown with light red tinge | G-Good, flat, surface regular, hard VM-Red with orange tinge (Or3r) AM-White (W1); mealy SP-Strong red (Or4r) | G-Good, high, surface very rough VM-Strong orange (Oc2r) AM-Absent SP-Strong red to brown (O4r) | G-Abundant, coarse VM-Colourless to yellowish AM-Whitish SP-Intense amber | G-Good, rough VM-Reddish brown to orange AM-Mealy, fine pale orange SP-Brown | G-Abundant rolled up AM-White at the edge R-Colourless SP- |
| Medium 3 of Shirling & Gottlieb | G-Moderate to good, flat, with high edges VM-Light brown with orange tinge (centre of the colony) to orange with red tinges (edges of the colony (Oc3r-O3r) AM-Absent SP-Ash-grey with slight tinge of brown (Coo6t) | G-Good, high, surface rough, hard and crusty VM-Pale, with light yellow tinge (Co6a) AM-White (W1), mealy SP-Colourless to pale pink (Or2a) | G-Moderate, flat VM-Yellow brown (Coo2r) AM-Residues, white at the edge of the colony (W1) SP-Yellow brown (Coo2r) | G-Moderate surface smooth VM-Crystalline to yellowish AM-Whitish with pink tinge SP-Weak, yellowish | G-White Orange to light orange with a rough surface AM-Mealy, abundant pinkish white SP-None | Not described |
| Medium 4 of Shirling & Gottlieb | G-Moderate, slightly elevated, surface wrinkled VM-Slightly brown with orange tinge to intense orange (Oc3r-Oc-2r) AM-Absent SP-Light brown lavender (Oc5m) | G-Moderate to good VM-Pale with a slight tinge of grey AM-White (W1) SP-Absent | G-Good, flat surface smooth VM-Salmon pink (O3a) AM-Residues, white (W1) SP-Pale orange (Oc2a) | G-Sparse VM-Colourless to light orange red AM-Sparse, white SP-Absent | G-White, yellow orange AM-Abundant, mealy pale orange SP-Orange, residues | G-Moderate colourless AM-Poor, white at the edges R-Colourless SP-None |
| Medium 5 of Shirling & Gottlieb | G-Moderate, flat, lightly wrinkled VM-Pale orange (Oc2a) AM-Absent SP-Absent | G-Good, high, hard rough surface VM-Light orange to brown (Oc2a to Oc4r) AM-Sparse, pale pink with brown tinges (Oc5a) | G-Good, flat rough surface VM-Intense orange (O2r) AM-Absent SP-Light yellow (Co2o) | G-Moderate, surface smooth VM-Light pinkish orange AM-Absent SP-Light yellow | Not described | Not described |
| Medium 6 of Shirling & Gottlieb | G-Moderate, flat smooth surface VM-Light brown to pale (Coo5b) AM-Absent SP-Yellow with a slight green tinge (Coo3m) | G-Moderate, flat, smooth surface VM-Pale (Co5a) AM-Very sparse, white (W1) SP-Light, pale brown (Coo3m) | G-Moderate, flat smooth surface VM-Pale (Co5a) AM-Absent SP-Absent | G-Moderate, flat surface slightly rough VM-Light brown yellow tinge (Coo4a) AM-Absent SP-Absent | Not described | Not described |
| Medium 7 of Shirling & Gottlieb VM-Light brown | G-Moderate, flat surface rough surface orange (Oc2r) AM-Absent SP-Yellow with a slight tinge of green (Coo3m) | G-Good, high, hard rough VM-Light brown with orange to brown tinges (Oc3r to Oc4r) AM-Sparse; light pink with brown tinge (Oc5a) SP-Reddish brown (O4r) | G-Good, high rough surface AM-Not described VM-Intense orange(O2r) AM-Absent SP-Light orange (Oc2a) | G-Poor VM-Not dark described yellow SP-Not described | G-Moderate, colourless from to yellow orange AM-Weak, mealy white to pinkish white SP-None | G-Moderate, 2 AM-Poor, white R-Colourless SP-None |

TABLE 4—Continued

CHARACTERISTICS OF THE CULTURES OF SOME STANDARD MEDIA

| Media | Str. G5/A | Str. Albovinaceus ATCC 12951 | Str. Mediterranei ATCC 21271 | Str. Mediterranei ATCC 13685 | 4107 A | B 2847 |
|---|---|---|---|---|---|---|
| Agarized Ca-malate | G-Good, surface slightly elevated and wrinkled VM-Faded orange to yellow brown (Oc2a to Oc3r) AM-Absent SP-Brown red to yellowish brown (Or 2a-Coo2a) | G-Good, flat, surface smooth VM-Yellowish (Co2a) AM-White (W1) SP-Colourless to light yellow (Co3a) | G-Moderate, flat, surface slightly rough VM-Pale orange (Oc2a) AM-Absent SP-Yellow brown (Coo2r) | G-Regular VM-Colourless AM-Whitish with a pink tinge SP-Absent | G-Good, red to black AM-Mealy, reddish orange in part light yellow orange SP-Purple, traces | G-Moderate pale yellow orange, penetrating into the medium AM-Fine, white R-Pale from yellow orange to chamois ochre (Rdg.XV 15'-6) SP-Chamois (Rdg. XXX 19''-6) |

G = Growth
AM = aerial mycelium
R = reverse
VM = vegetative mycelium
SP = soluble pigment
Rdg = R. Ridgway - Color standards and color nomenclature, Washington, D.C. 1912

The following examples illustrates the invention but are not limitative.

EXAMPLE 1

A culture of Streptomycen G5/A is inoculated into a 500 ml. Erlenmeyer flask containing 100 ml. of medium composed as follows:

| | |
|---|---|
| Meat extract | g. 5 |
| Yeast extract | g. 5 |
| Peptone | g. 5 |
| Casein hydrolysate | g. 3 |
| Glucose | g. 20 |
| NaCl | g. 15 |
| Distilled water to 1,000 ml. | |
| pH | 7.3 |

After 48 hours of growth on a reciprocating shaker at 28°C. 10% (v/v) of the vegetative growth is transferred to 500 ml. Erlenmeyer flask fitted with a baffle and containing 100 ml. of the following medium:

| | |
|---|---|
| Glucose | g. 70 |
| Soybean meal | g. 5 |
| Peanut meal | g. 20 |
| Ammonium sulphate | g. 7 |
| $KH_2PO_4$ | g. 2 |
| $CaCO_3$ | g. 6 |
| $MgSO_4.7H_2O$ | g. 1 |
| $CuSO_4.5H_2O$ | mg. 3.3 |
| $ZnSO_4.7H_2O$ | mg. 50 |
| $MnSO_4.4H_2O$ | mg. 4 |
| $FeSO_4.7H_2O$ | mg. 10 |
| $CoCl_2.6H_2O$ | mg. 2 |
| Ammonium molybdate | mg. 1 |
| distilled water to 1,000 ml. | |
| pH (adjusted with buffers) | 7 |

The inoculated flasks were incubated at 28°C. on a rotary shaker at 250 r.p.m. with a 5 cm. stroke for 148-156 hours. The yield of rifamycin B was from 4000 - 4500 mcg/ml.

EXAMPLE 2

The microorganism known as G5/A is grown in the same conditions described in Example 1 for the vegetative phase.

The following fermentation medium has used in the final phase.

| | |
|---|---|
| Peanut meal | g. 25 |
| Soybean meal | g. 10 |
| Glucose | g. 100.5 |
| Propylene glycol | g. 5 |
| Glycerol | g. 40 |
| Heavy $CaCo_3$ | g. 9.5 |
| $(NH_4)_2SO_4$ | g. 4.9 |
| $KH_2PO_4$ | g. 2 |
| $MgSO_4.7H_2O$ | g. 0.85 |
| Ammonium molybdate | g. 0.001 |
| $MnSO_4.4H_2O$ | g. 0.004 |
| $CoCl_2.6H_2O$ | g. 0.002 |
| $ZnSO_4.7H_2O$ | g. 0.05 |
| $CuSO_4.5H_2O$ | g. 0.0033 |
| $FeSO_4.7H_2O$ | g. 0.01 |
| Water to 1,000 ml. | |
| pH (adjusted with buffer) 6.6 – 6.7 after sterilization. | |

Fermentation was conducted as in Example 1. The maximum strength of rifamycin B reached was 5400 mcg/ml. In chromatography no appreciable quantities of products similar to rifamycin were found.

EXAMPLE 3

The microorganism known as G5/A was grown in the same conditions described in Example 1, using however 2,000 ml. flasks containing 500 ml. of medium; after 48 hours 3 flasks were used to inoculate 90 litres of the same medium in a stainless steel fermentor.

Vegetative growth took place with agitation (500 r.p.m;) and aeration (1 v/v/m) at 28°C.

After 36 hours about 7 percent in volume of mycelial growth was obtained: this second vegetative phase was used to inoculate a 1,300 litre stainless steel fermentor containing 900 litres of fermentation medium, as described in Example 2.

Growth of the organism took place at 28°C with agitation (170 r.p.m.) and aeration (1 v/v/min) and overpressure of 0.2 kg/cm².

After 150 hours of fermentation the spectrophotometric titre was 5200/5500 ml. Chromatographic analysis showed only rifamycin B to be substantially present.

What we claim is:

1. A process for producing Rifamycin B, comprising: cultivating the mutant known as Streptomyces G 5/A capable of high productivity, in a buffered nutrient medium containing assimilable sources of carbon, nitrogen and inorganic salts under submerged aerobic conditions.

* * * * *